United States Patent
Roberts et al.

[11] Patent Number: 5,860,025
[45] Date of Patent: Jan. 12, 1999

[54] PRECHARGING AN OUTPUT PERIPHERAL FOR A DIRECT MEMORY ACCESS OPERATION

[76] Inventors: David G. Roberts, 40802 Capa Dr., Fremont, Calif. 94539; Robert Alan Williams, 22255 Canyon View Cir., Cupertino, Calif. 95014; Glen William Gibson, 609 Burney Creek Pl., San Ramon, Calif. 94583; Jiu An, 4857 Bela Dr., San Jose, Calif. 95129; RamKrishna Vepa, 34273 Ethan Ter., Fremont, Calif. 94555; Henry Yeh, 19938 Twilight Ct., Cupertino, Calif. 95014; Din-I Tsai, 39562 Benavente Ave., Fremont, Calif. 94539

[21] Appl. No.: 677,406

[22] Filed: Jul. 9, 1996

[51] Int. Cl.$^6$ .............................. G06F 13/12; G06F 13/14
[52] U.S. Cl. ..................... 395/843; 395/843; 395/325; 395/425; 395/400; 365/230.03
[58] Field of Search ...................... 395/325, 425, 395/400, 843; 365/230.03; 377/20

[56] References Cited

U.S. PATENT DOCUMENTS

| 4,382,179 | 5/1983 | Penton | 377/20 |
| 4,574,344 | 3/1986 | Harris et al. | 395/500 |
| 4,737,908 | 4/1988 | Shinohara et al. | 364/200 |
| 4,812,972 | 3/1989 | Chastain et al. | 395/387 |
| 5,109,491 | 4/1992 | Nakagawa et al. | 711/207 |
| 5,179,675 | 1/1993 | Cole et al. | 711/3 |
| 5,428,760 | 6/1995 | Ghori et al. | 711/149 |
| 5,726,947 | 4/1996 | Yamazaki et al. | 365/230.03 |

Primary Examiner—Curtis A. Kuntz
Assistant Examiner—Hassen A. Mia
Attorney, Agent, or Firm—Fliesler, Dubb, Meyer & Lovejoy, LLP

[57] ABSTRACT

A data transfer method with peripheral precharge wherein a starting portion of an output data block targeted for a peripheral is transferred to an output buffer for the peripheral using programmed I/O or slave cycles and wherein a virtual address of the output data block is translated into a physical address while the peripheral begins transferring the starting portion from the output buffer and over an output path. A direct memory access operation by the peripheral transfers a remainder portion of the output data block into the output buffer.

21 Claims, 4 Drawing Sheets

PRECHARGING AN OUTPUT PERIPHERAL FOR A DIRECT MEMORY ACCESS OPERATION

BACKGROUND OF THE INVENTION

1. Field of Invention

The present invention pertains to the field of computer systems. More particularly, this invention relates to data transfer operations for peripherals in a computer system.

2. Art Background

Prior computer systems typically include a host processor and a host memory along with a variety of input/output (I/O) peripherals. Such I/O peripherals may comprise, for example, I/O controllers for mass storage devices and network interfaces. Prior computer systems typically include one or more buses such as host buses, specialized I/O buses or peripheral buses that enable communication between a host processor and the I/O peripherals.

One prior method for transferring information to an I/O peripheral via such buses may be referred to as programmed I/O or slave cycles. Typically, such programmed I/O is performed by a host processor. Such a host processor usually transfers a data block from a host memory to the I/O peripheral by employing a series of read cycles and write cycles on such buses. Such programmed I/O operations usually consume a relatively large number of host processor cycles if the data blocks consumed by an I/O peripheral are relatively large. Unfortunately, such excessive consumption of host processor cycles typically slows other operations in the computer system.

Another prior method for transferring information to an I/O peripheral may be referred to as direct memory access (DMA). Such DMA transfers are usually performed by DMA circuitry that is external to the host processor. Typically, the host processor provides the address and length of the data block contained in host memory to the DMA circuitry. The DMA circuitry then usually arbitrates for control of the host bus or I/O bus and obtains control as a bus master. The DMA circuitry then reads the data block directly from the host memory while the host processor is free to perform other tasks.

Prior I/O peripherals such as disk controllers or network controllers that consume relatively large data blocks commonly employ DMA data transfers because DMA operations are usually more efficient than programmed I/O operations. For example, the transfer of a data word using programmed I/O usually requires two bus cycles by the host processor including a read from host memory and a write to the I/O peripheral. A DMA operation, on the other hand, typically includes only one bus transaction per data word which is a direct read from the host memory by the I/O peripheral. In addition, some prior computer systems include I/O buses that enable special burst data transfers during such DMA operations. Such burst data transfers typically enable the transfer of multiple data words in quick succession to an I/O peripheral.

Prior I/O peripherals are usually managed by hardware dependent driver routines that execute on a host processor. Typically, an operating system executing on a host processor calls a driver routine to manage a particular I/O peripheral and to perform data transfers to that I/O peripheral.

In addition, prior host processors commonly implement a memory management mechanism that maps the limited address space of the host memory to a virtual address space for the host processor. The operating system and driver routines typically reference data blocks stored in the host memory with virtual addresses. I/O peripherals, on the other hand, usually reference data blocks stored in the host memory with physical addresses rather than virtual addresses.

As a consequence, prior driver routines typically convert the virtual addresses of data blocks stored in host memory into physical addresses which are used by the I/O peripheral. Such a driver routine usually converts a virtual address to a physical address by calling an operating system routine that translates virtual addresses to physical addresses. In addition, such a driver routine commonly calls operating system routines that lock output data blocks into the host memory which prevents paging operations on the output data blocks during DMA operations.

Unfortunately, such virtual to physical address translations and memory page locking operations consume time and usually delay the start of a DMA operation. Such delays in the start of a DMA operation typically slow the overall data output performance of such I/O peripherals.

SUMMARY AND OBJECTS OF THE INVENTION

One object of the present invention is to improve the performance of I/O peripherals.

Another object of the present invention is to reduce delays to the start of output transfers by I/O peripherals.

A further object of the present invention is to employ programmed I/O or slave cycles to precharge output transfers to DMA peripherals.

Another object of the present invention is to reduce the amount of host processor cycles required to control an I/O operation and thereby increase the number of host processor cycles available for executing other tasks.

These and other objects are provided by a data transfer method in a computer system including DMA precharge of an output buffer wherein a first portion of an output data block targeted for a peripheral is transferred to the output buffer using read and write cycles on a bus coupled to the peripheral. A virtual address of the output data block is translated into a physical address while the peripheral begins transferring the first portion from the output buffer and over an output path. A direct memory access operation by the peripheral using the physical address transfers a second portion of the output data block into the output buffer after completion of the address translation.

Other objects, features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
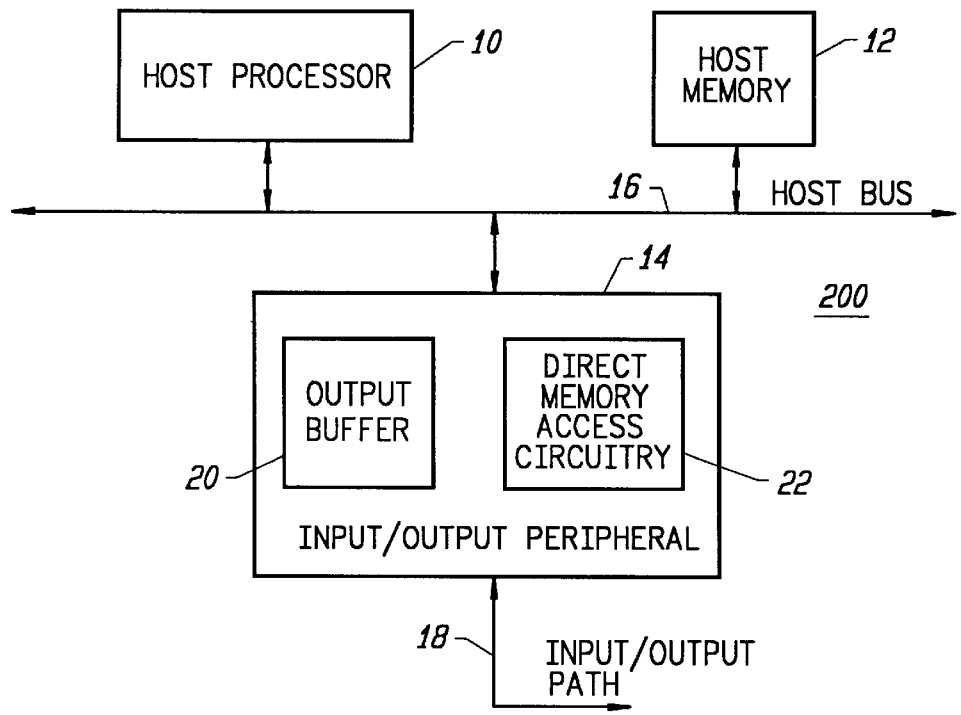
FIG. 1 illustrates a computer system in one embodiment that performs output buffer precharging for an I/O peripheral.

FIG. 1 illustrates a computer system 200 that includes precharging and DMA transfers for an I/O peripheral 14. The computer system 200 includes a host processor 10 and a host memory 12. In this embodiment, the host processor 10 communicates with the I/O peripheral 14 via a host bus 16 which also functions as an I/O bus for the computer system 200. In addition, the I/O peripheral 14 performs DMA operations by reading the host memory 12 via the host bus 16.

The I/O peripheral 14 includes an output buffer 20 and a set of direct memory access (DMA) circuitry 22. In one embodiment, the I/O peripheral 14 including the output buffer 20 and the DMA circuitry 22 are contained on an integrated circuit chip. The I/O peripheral 14 may be referred to as a peripheral controller or an I/O controller or a peripheral interface chip. In another embodiment, the DMA circuitry 22 is not integrated with the I/O peripheral 14. In such an embodiment, the separate DMA circuitry 22 may service a set of I/O peripherals including the I/O peripheral 14.

The output buffer 20 holds data for transfer over an I/O path 18. The host processor 10 loads or "precharges" the I/O buffer 20 with programmed I/O operations via the host bus 16. In addition, the DMA circuitry 22 loads the output buffer 20 by arbitrating for control of the host bus 16 and performing read operations from the host memory 12 via the host bus 16.

In one embodiment, the output buffer 20 comprises a first-in first-out (FIFO) output buffer. The output buffer 20 adapts the data transfer rate of the I/O path 18 to the data transfer rate of the host bus 16. The data transfer rate on the host bus 16 during DMA operations or programmed I/O is higher than the data transfer rate on the I/O path 18 in applications, for example, wherein the I/O path 18 is a communication link to a network such as an Ethernet network. In addition, the DMA transfer rate on the host bus 16 is higher than the data transfer rate for standard interface buses to mass storage devices such as small computer systems interface (SCSI) buses.

Figure 2:
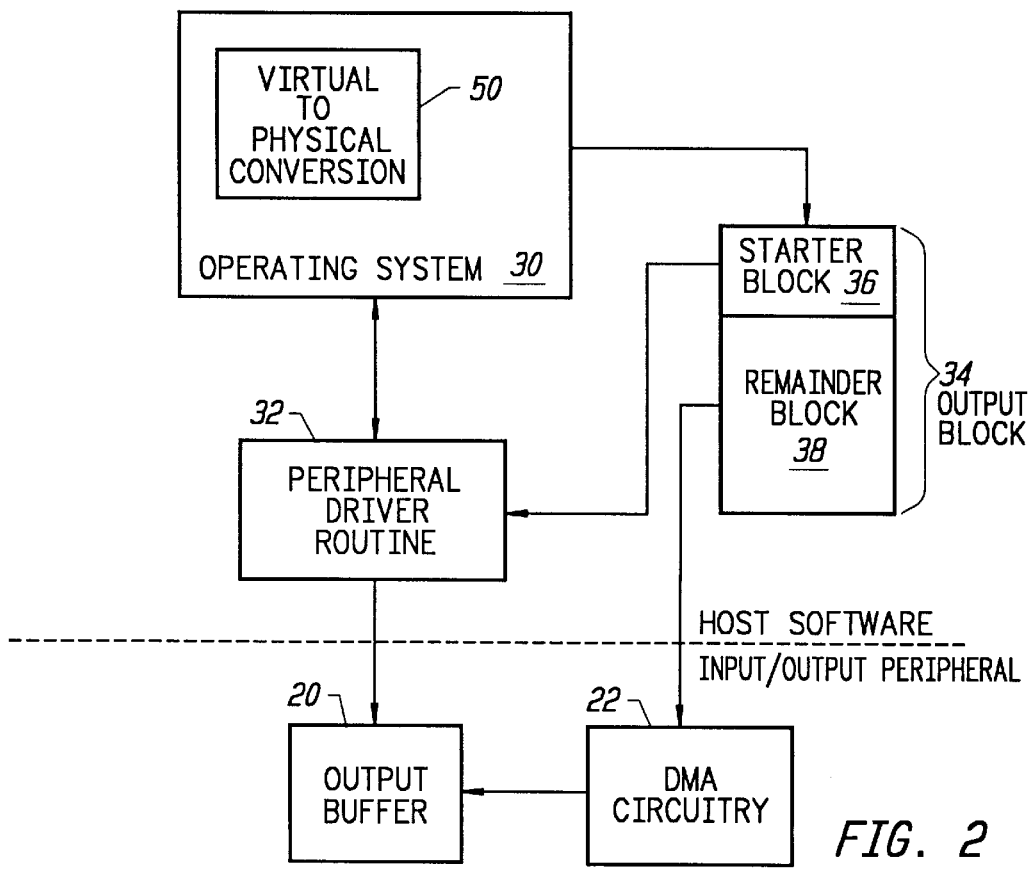
FIG. 2 illustrates the software elements of a computer system that communicate with the output buffer and the DMA circuitry of the I/O peripheral.

FIG. 2 illustrates software elements of the computer system 200 that communicate with the output buffer 20 and the DMA circuitry 22. The host processor 10 executes an operating system 30 and a peripheral driver routine 32. The peripheral driver routine 32 performs hardware dependent functions for the I/O peripheral 14.

The operating system 30 initiates an output data transfer operation to the I/O peripheral 14 by writing an output block 34 containing a set of data bytes or words for transfer via the I/O path 18 into the host memory 12. The operating system 30 then calls the peripheral driver routine 32 and passes a starting virtual address and block length for the output block 34.

In one embodiment, the operating system 30 passes a pointer to a descriptor block to the peripheral driver routine 32. The descriptor block specifies one or more subblocks including starting virtual addresses and subblock lengths. The peripheral driver routine 32 then processes the subblocks individually. The peripheral driver routine 32 may switch from programmed I/O mode to DMA mode at a subblock boundary or in the middle of a subblock.

For the example illustrated, the output block 34 is contained in one subblock and the peripheral driver routine 32 subdivides the output block 34 into a starter block 36 for precharging the output buffer 20 and a remainder block 38. The peripheral driver routine 32 precharges the transfer of the output block 34 by transferring the starter block 36 into the output buffer 20. Thereafter, the I/O peripheral 14 transfers the starter block 36 from the output buffer 20 to the appropriate destination via the I/O path 18. During the time that the I/O peripheral 14 begins transferring the starter block from the output buffer 20 to the destination on the I/O path 18, the driver routine 32 calls a virtual to physical conversion routine 50 in the operating system 30 to convert the starting virtual address of the output block 34 into a physical address. As a consequence, the call to the virtual to physical conversion routine 50 overlaps the start of data transfer over the I/O path 20.

After receiving the starting physical address of the output block 34 from the virtual to physical conversion routine 50, the peripheral driver routine 32 sets up a DMA transfer for the remainder block 38. The peripheral driver routine 32 computes the starting physical address of the remainder block 38 according to the length of the starter block 36 and the starting physical address returned by the virtual to physical conversion routine 50. The peripheral driver routine 32 writes the starting physical address of the remainder block 38 to the DMA circuitry 22 during setup of the DMA transfer.

Thereafter, the DMA circuitry 22 reads the remainder block 38 from the host memory 12 and transfers the remainder block 38 into the output buffer 20. During this time, the I/O peripheral 14 continues transferring the starting block 36 and then the remainder block 38 from the output buffer 20 in a first-in first-out fashion to the ultimate destination on the I/O path 18.

The amount of data contained in the starter block 36 is selected according to the speed with which the host processor 10 executes the virtual to physical conversion routine 50 and the speed with which the I/O peripheral 14 empties the contents of the output buffer 20 to the I/O path 18. The length of the starter block 36 is selected such that very few bytes of data from the starter block 36 remain in the output buffer 20 at the start of the DMA operation that loads the remainder block 38 into the output buffer 32.

If the operating system 30 calculates virtual to physical address translations relatively quickly, then fewer data bytes are contained in the starter block 36. If the operating system 30 calculates virtual to physical address translations relatively slowly, then more data bytes are contained in the starter block 36. If the overall length of the output block 34 is relatively small or if the operating system 30 is relatively slow, then the host processor 10 preferably performs the transfer of the output block 34 to the output buffer 20 using programmed I/O operations.

The speed of with which the operating system 30 executes the virtual to physical conversion routine 50 depends on a number of factors including the type of hardware implementation of the host processor 10, and the number and type of application programs and background programs executed by the host processor 10. The time consumed by the operating system 30 in performing the virtual to physical address translation can vary significantly over time as application programs and other routines are launched and removed. The peripheral driver routine 32 periodically performs timing tests on the virtual to physical conversion routine 50 and then adjusts the number of bytes in the starter block 36 accordingly such that very few bytes of data from the starter block 36 remain in the output buffer 20 at the start of the DMA operation that loads the remainder block 38 into the output buffer 32.

The speed with which the I/O peripheral 14 "flushes" the contents of the output buffer 20 to the I/O path 18 depends on the speed of the I/O path 18. If the I/O path 18 is a 10 megabit per second Ethernet communication link, for example, then the I/O peripheral 14 flushes one byte from the output buffer 20 every 800 nanoseconds. If the I/O path 18 is a 100 megabit per second Ethernet communication link, then the I/O peripheral 14 flushes one byte from the output buffer 20 every 80 nanoseconds. Thus, a 100 megabit per second link requires a greater data length of the starter block 36 for a given speed of virtual to physical address translation by the operating system 30.

Figure 3:
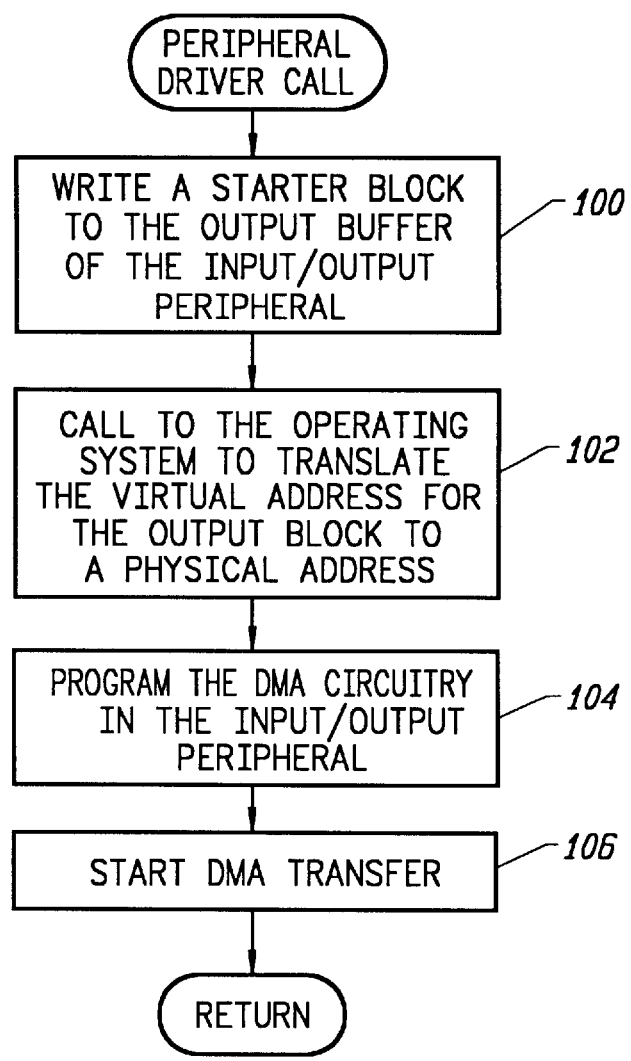
FIG. 3 illustrates a call to a peripheral driver routine to request transfer of the output data block by the I/O peripheral.

FIG. 3 illustrates a call to the peripheral driver routine 32 by the operating system 30. The operating system 30 calls the peripheral driver routine 32 to request transfer of the output block 34 to a destination on the I/O path 18 and passes a starting virtual address for the output block 34.

At block 100, the peripheral driver routine 32 writes the starter block 36 into the output buffer 20. The peripheral driver routine 32 addresses the starter block 36 using the starting virtual address for the output block 34 passed with the call from the operating system 30. The peripheral driver routine 32 uses programmed read cycles from the host memory 12 and write cycles to the output buffer 20 to transfer the starter block 36 into the output buffer 20. The output buffer 20 may be mapped to a memory address space of the host processor 10 or to an I/O address space of the host processor 10.

At block 102, the peripheral driver routine 32 calls the virtual to physical conversion routine 50 in the operating system 30 to translate the starting virtual address of the output block 34 into a physical address. At block 104, the peripheral driver routine 32 adds the length of the starter block 36 to a physical address returned from the virtual to physical conversion routine 50 which yields a starting physical address for the remainder block 38. The peripheral driver routine 32 then programs the DMA circuitry 22 in the I/O peripheral 14 with the starting physical address of the remainder block 38.

Alternatively, the peripheral driver routine 32 computes a starting virtual address of the remainder block 38 by adding the length of the starter block 36 to the starting virtual address of the output block 34 passed by the operating system 30. The peripheral driver routine 32 then calls the virtual to physical conversion routine 50 to translate the starting virtual address of the remainder block 38 into a physical address.

At block 106, the peripheral driver routine 32 signals the DMA circuitry 22 to begin a DMA operation to transfer the remainder block 38 from the host memory 12 into the output buffer 20. The DMA circuitry 22 obtains control as bus master of the host bus 16 and generates read cycles on the host bus 16 to read the remainder block 38 from the host memory 12.

Figure 4:
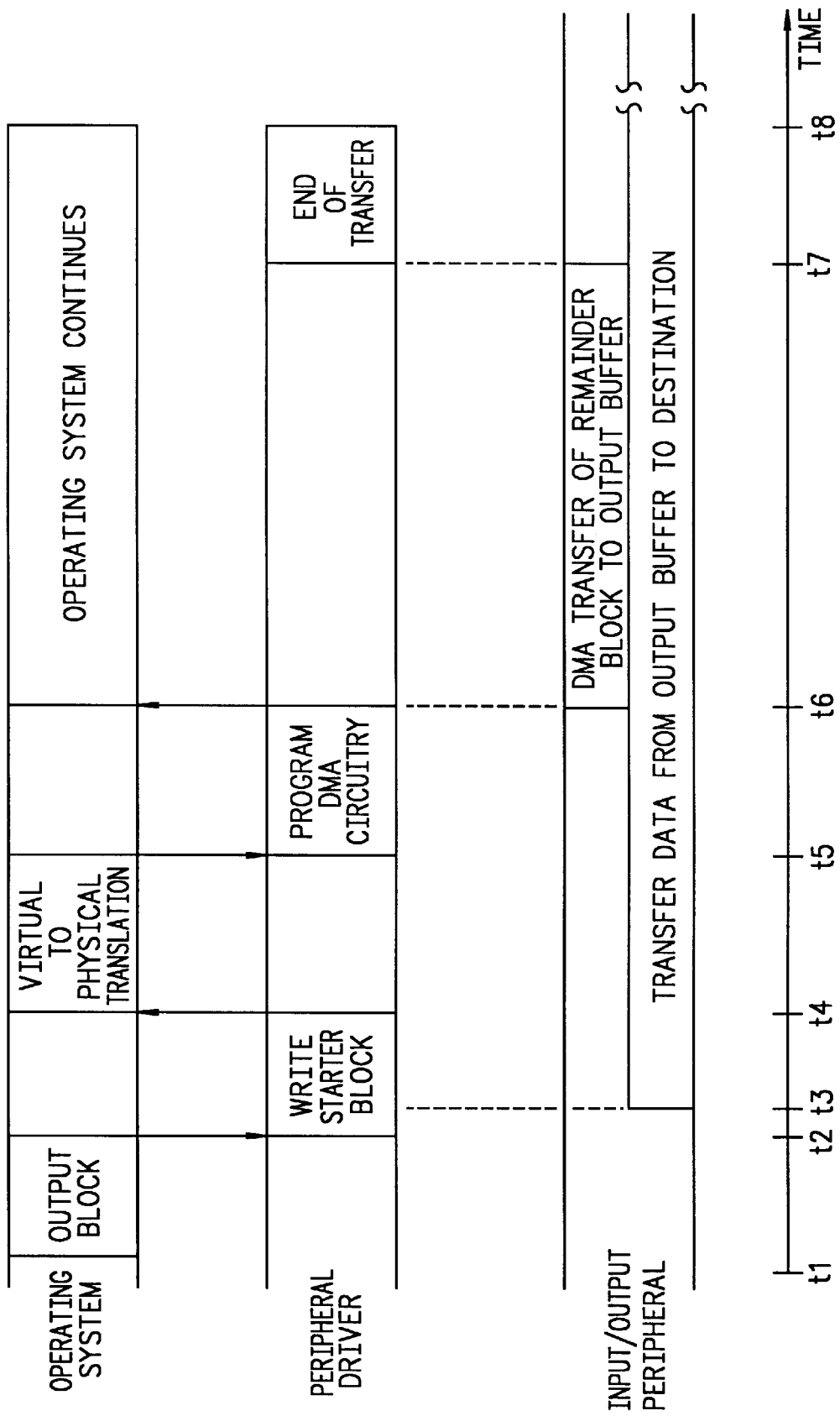
FIG. 4 illustrates the timing of precharged data transfer through the I/O peripheral.

FIG. 4 illustrates the timing of a precharged data transfer through the I/O peripheral 14. The communication between the operating system 30 and the peripheral driver routine 32 is shown in relation to activities involving the output buffer 20 and the DMA circuitry 22 in the I/O peripheral 14.

Between times t1 and t2, the operating system 30 assembles the output block 34 into the host memory 12. The assembly of the output block 34 into the host memory 12 may involve other application programs or driver programs implemented in the computer system 200.

At time t2, the operating system 30 calls the peripheral driver routine 32 and passes the starting virtual address of the output block 34. Between times t2 and t4, the peripheral driver routine 32 writes the starter block 36 into the output buffer 20 using programmed I/O cycles on the host bus 16 including reads from the host memory 12 and writes to the output buffer 20. During the programmed I/O cycles, the built-in memory management hardware of the host processor 10 automatically converts virtual addresses generated by the peripheral driver routine 32 into physical addresses for transfer via the host bus 16.

At time t3, a threshold amount of data from the starter block 36 is contained in the output buffer 20. Once the threshold amount of data is reached, the I/O peripheral 14 begins flushing the output buffer 20 by transferring data from the output buffer 20 over the I/O path 18.

At time t4, the peripheral driver routine 32 calls the virtual to physical conversion routine 50 of the operating system 30 and passes the starting virtual address of the output block 34. The starting virtual address of the output block 34 is translated into a physical address between times t4 and t5.

At time t5, the virtual to physical conversion routine 50 returns to the peripheral driver routine 32 with the starting physical address of the output block 34. Between times t5 and t6, the peripheral driver routine 32 programs the starting physical address of the remainder block 38 into the DMA circuitry 22 and initiates a DMA transfer operation. At time t6, the peripheral driver routine 32 returns to the operating system 30 while the DMA circuitry 22 starts the DMA transfer of the remainder block 38.

Between times t6 and t7, the DMA circuitry 22 reads the remainder block 38 from the host memory 12 by generating read cycles via the host bus 16 and transfers the remainder block 38 into the output buffer 20. During this time, the I/O peripheral 14 continues to transfer or "flush" the contents of the output buffer 20 to the I/O path 18 and onto the appropriate destination.

At time t7, the DMA circuitry 22 completes the transfer of the remainder block 38 into the output buffer 20. After time t7, the I/O peripheral 14 continues to flush the contents of the output buffer 20 to the I/O path 18. The peripheral driver routine 32 performs end of data transfer operations and returns the subblocks containing the output block 34 to the upper layers in the operating system 30.

Figure 5:
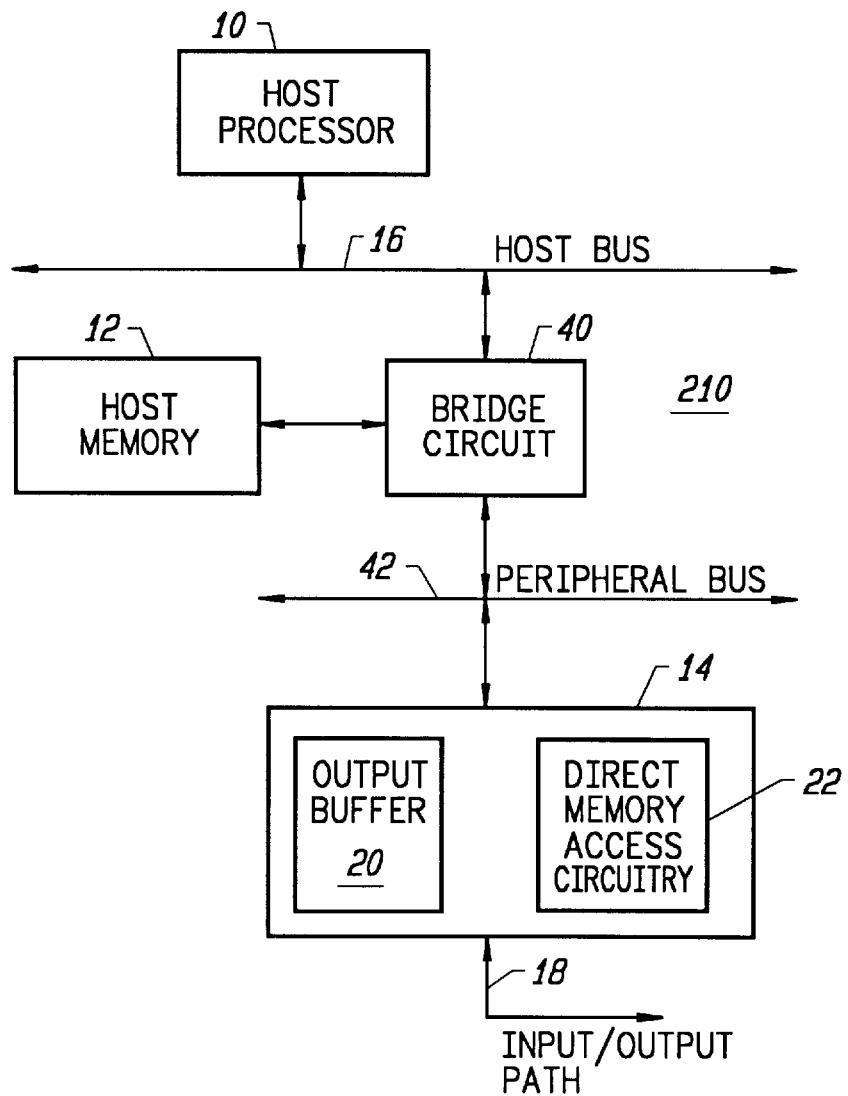
FIG. 5 illustrates a computer system in another embodiment that includes output buffer precharging for an I/O peripheral.

FIG. 5 illustrates a computer system 210 that includes precharging for transfers to the I/O peripheral 14. The computer system 210 includes the host processor 10 coupled to the host bus 16 and the I/O peripheral 14 which in this embodiment is coupled to a peripheral bus 42. The computer system 210 includes a bridge circuit 40 that enables communication between the host bus 16 and the peripheral bus 42. In addition, the bridge circuit 40 enables access to the host memory 12 from both the host bus 16 and the peripheral bus 42.

The bridge circuit 40 translates bus cycles initiating on the host bus 16 from the host processor 10 and targeted for the I/O peripheral 14 into bus cycles for the peripheral bus 42. The bridge circuit 40 enables the operating system 30 and the peripheral driver routine 32 to transfer the output block 34 to the output buffer 20 by translating write cycles on the host bus 16 into write cycles on the peripheral bus 42. In addition, the bridge circuit 40 enables the operating system 30 and the peripheral driver routine 32 to read and to write the output block 34 in the host memory 12 via the host bus 16.

The bridge circuit 40 enables the DMA circuitry 22 to read the host memory 12 via the peripheral bus 42. The DMA circuitry 22 within the I/O peripheral 14 arbitrates and obtains control over the peripheral bus 42 and performs read operations from the host memory 12 through the bridge circuit 40 during DMA operations.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A data transfer method in a computer system, comprising the steps of:

transferring a first portion of an output data block targeted for a peripheral to an output buffer for the peripheral using read and write cycles on a bus coupled to the peripheral;

translating a virtual address of the output data block into a physical address while the peripheral begins transferring the first portion from the output buffer and over an output path;

initiating a direct memory access operation that causes the peripheral to use the physical address to read a second portion of the output data block via the bus and transfer the second portion into the output buffer.

2. The data transfer method of claim 1, further comprising the step of transferring the second portion from the output buffer and over the output path.

3. The data transfer method of claim 1, wherein the virtual address specifies a starting address of the output data block.

4. The data transfer method of claim 1, wherein the virtual address specifies a starting address of the second portion of the output data block.

5. The data transfer method of claim 1, wherein the output data block is contained in a host memory of the computer system.

6. The data transfer method of claim 1, wherein the step of transferring a first portion of an output data block is performed by a peripheral driver routine that executes on the computer system and that corresponds to the peripheral.

7. The data transfer method of claim 6, wherein the step of translating a virtual address of the output data block into a physical address is performed by an operating system that executes on the computer system.

8. The data transfer method of claim 7, wherein the step of translating a virtual address of the output data block into a physical address is performed by a translation routine in the operating system.

9. The data transfer method of claim 8, wherein the peripheral driver routine calls the translation routine after transferring the first portion of the output data block into the output buffer.

10. The data transfer method of claim 9, further comprising the step of determining a length of the first portion of the output data block based according to an execution time of the translation routine.

11. The data transfer method of claim 10, wherein the step of determining a length of the first portion of the output data block comprises the step of measuring the execution time of the translation routine.

12. The data transfer method of claim 11, wherein the step of determining a length of the first portion of the output data block comprises the step of increasing the length of the first portion if the execution time increases.

13. The data transfer method of claim 11, wherein the step of determining a length of the first portion of the output data block comprises the step of decreasing the length of the first portion if the execution time decreases.

14. A computer readable medium having computer instructions stored thereon that, when loaded into a computer, cause the computer to perform the steps of:

transferring a first portion of an output data block targeted for a peripheral to an output buffer for the peripheral using read and write cycles on a bus coupled to the peripheral;

translating a virtual address of the output data block into a physical address while the peripheral begins transferring the first portion from the output buffer and over an output path; and initiating a direct memory access operation that causes the peripheral to use the physical address to read a second portion of the output data block via the bus and transfer the second portion into the output buffer.

15. The computer readable medium according to claim 14, wherein said computer instructions stored thereon, when loaded into a computer, cause the computer to further perform the step of:

determining a length of the first portion of the output data block based on at least one of an execution time of the translation routine and a transfer time required by the peripheral to transfer the first portion from the output buffer and over an output path.

16. The computer readable medium according to claim 15, wherein said computer instructions stored thereon, when loaded into a computer, cause the computer to further perform the steps of:

increasing the length of the first portion of the output data block when the execution time of the translation routine increases; and decreasing the length of the first portion of the output data block when the execution time of the translation routine decreases.

17. The computer readable medium according to claim 15, wherein said computer instructions stored thereon, when loaded into a computer, cause the computer to further perform the steps of:

performing periodic timing tests to measure the execution time of the translation routine; and repeating said steps of determining, increasing, and decreasing to adjust the length of the first portion in accordance with the execution time measured.

18. An apparatus for transferring data in a computer system, comprising:

a first transfer device configured to transfer a first portion of an output data block targeted for a peripheral to an output buffer for the peripheral using read and write cycles on a bus coupled to the peripheral;

a translator configured to translate a virtual address of the output data block into a physical address while the peripheral begins transferring the first portion from the output buffer and over an output path; and a direct memory access device configured to perform a direct memory access operation that causes the peripheral to use the physical address to read a second portion of the output data block via the bus and transfer the second portion into the output buffer.

19. The apparatus according to claim 18, further comprising:

a block length device configured to determine a length of the first portion of the output data block based on at least one of an execution time of the translation routine and a transfer time required by the peripheral to transfer the first portion from the output buffer and over an output path.

20. The apparatus according to claim 19, wherein:

said block length device, increases the length of the first portion of the output data block if the execution time of the translation routine increases, and decreases the length of the first portion of the output data block if the execution time of the translation routine decreases.

21. The apparatus according to claim 19, further comprising a timing device configured to perform periodic timing tests to measure the execution time of the translation routine and provide the measured execution time to said block length device.

* * * * *